US012234967B1

(12) United States Patent
Liu et al.

(10) Patent No.: US 12,234,967 B1
(45) Date of Patent: Feb. 25, 2025

(54) OVERMOLDED EXTRUDATE STRUCTURE AND FLEXIBLE LED LIGHT STRIP

(71) Applicants: SHENZHEN CLEAR LIGHTING CO., LTD., Guangdong (CN); HUIZHOU CLEAR LIGHTING CO., LTD., Guangdong (CN)

(72) Inventors: Changgui Liu, Shenzhen (CN); Minfei Huang, Shenzhen (CN)

(73) Assignees: SHENZHEN CLEAR LIGHTING CO., LTD., Shenzhen (CN); HUIZHOU CLEAR LIGHTING CO., LTD., Huizhou (CN)

( * ) Notice: Subject to any disclaimer, the term of this patent is extended or adjusted under 35 U.S.C. 154(b) by 0 days.

(21) Appl. No.: 18/637,405

(22) Filed: Apr. 16, 2024

(30) Foreign Application Priority Data

Aug. 16, 2023 (CN) ........................ 202322212806.4

(51) Int. Cl.
*F21V 15/01* (2006.01)
*F21S 4/22* (2016.01)
*F21Y 103/10* (2016.01)
*F21Y 115/10* (2016.01)

(52) U.S. Cl.
CPC .............. *F21V 15/013* (2013.01); *F21S 4/22* (2016.01); *F21Y 2103/10* (2016.08); *F21Y 2115/10* (2016.08)

(58) Field of Classification Search
CPC ........ F21V 15/013; F21S 4/22; F21Y 2103/10
See application file for complete search history.

(56) References Cited

U.S. PATENT DOCUMENTS 9,475,239 B2 * 10/2016 Abernathy .............. B29C 48/08
11,959,602 B1 * 4/2024 Mckay .................... F21V 23/06
2004/0142157 A1 * 7/2004 Melkonian ................ B32B 5/18
428/292.1
2008/0239716 A1 * 10/2008 Lin .......................... F21S 4/26
362/219
2016/0138768 A1 * 5/2016 Greene ................... F21V 23/06
29/842
2016/0356454 A1 * 12/2016 Camarota ............ F21V 21/005

* cited by examiner

*Primary Examiner* — Christopher E Dunay
(74) *Attorney, Agent, or Firm* — Leong C. Lei

(57) ABSTRACT

An overmolded extrudate structure is disclosed. The overmolded extrudate structure comprises an extrudate body and a continuous encapsulation component that covers at least part of the surface of said extrudate body, wherein said extrudate body includes two side plates and a bottom plate, which together form an accommodating space with an opening, said accommodating space is designed to accommodate and fix an LED light strip; said encapsulation component is configured to fit with said extrudate body, covering at least one of the outer and inner surfaces of said two side plates, as well as the top surface of said side plates. The present invention also provides a corresponding LED light strip. Implementing this invention allows for installation and use with bends in different directions, enhances the protective capability for the LED light strip, and can be applied to a wider range of scenarios.

6 Claims, 12 Drawing Sheets

OVERMOLDED EXTRUDATE STRUCTURE AND FLEXIBLE LED LIGHT STRIP

RELATED APPLICATIONS

This application claims priority to Chinese Patent Application Number CN 202322212806.4, filed on Aug. 16, 2023, entitled AN OVERMOLDED EXTRUDATE STRUCTURE AND FLEXIBLE LED LIGHT STRIP, all of the disclosures of which are incorporated herein by reference in their entirety.

FIELD OF THE INVENTION

Embodiments of the present disclosure relate to the field of lighting technology, and more particularly to an overmolded extrudate structure and flexible LED light strip.

DISCUSSION OF THE RELATED ART

In the installation of LED light strips, extrudates are often used as auxiliary fittings to secure and protect the LED products from damage due to external forces. They can be used both indoors and outdoors. Generally, extrudates are made of iron or steel, as well as materials with certain strength and toughness such as plastic, aluminum, glass fiber, etc., formed into objects with specific geometric shapes through rolling, extrusion, casting, and other processes.

As shown in FIG. 1, an existing extrudate structure is illustrated, which is made of aluminum, stainless steel, or other metals. It can be an auxiliary fixing shell custom-made according to the shape of different products. Typically, extrudates are developed with a U-shaped channel, and light strip products are secured by being snapped into the profile body, thus achieving a protective effect during use.

When using the existing extrudate structure for LED light strip installation, there are some drawbacks:

It cannot achieve bending installation, or can only realize bending installation in one direction.

It is not easy to create colored applications, and the color may fade after application, which also results in high costs.

SUMMARY

The technical problem to be solved by the present invention is to provide an overmolded extrudate structure and flexible LED light strip that can achieve bending installation in different directions, enhance protection for the LED light strip, and be applicable in more scenarios.

To solve above-mentioned technical problem, one aspect of the present invention provides an overmolded extrudate structure which comprises an extrudate body and a continuous encapsulation component that covers at least part of the surface of said extrudate body, wherein:

- said extrudate body includes two side plates and a bottom plate, which together form an accommodating space with an opening, said accommodating space is designed to accommodate and fix an LED light strip;
- said encapsulation component is configured to fit with said extrudate body, covering at least one of the outer and inner surfaces of said two side plates, as well as the top surface of said side plates.

Advantageously, said extrudate body is an integrally formed elongated extrudate body, alternatively, said extrudate body is assembled by splicing together a plurality of single-segment extrudates.

Advantageously, there is one encapsulation component and

- said encapsulation component closely adheres to and wraps around the inner and outer surfaces as well as the top surface of said extrudate body respectively; or
- said encapsulation component closely adheres to and wraps around the outer surface, top surface, and bottom surface of each side plate of said extrudate body respectively; or
- said encapsulation component closely adheres to and wraps around the inner surface, top surface, and bottom surface of each side plate of said extrudate body respectively; or
- said encapsulation component closely adheres to and wraps around the inner and outer surfaces, top surface, and bottom surface of each side plate of said extrudate body respectively; or
- said encapsulation component closely adheres to and wraps around the inner and outer surfaces, top surface, and the inner surface of the bottom plate of said extrudate body respectively.

Advantageously, there are two encapsulation components and

- each encapsulation component closely adheres to and covers the outer surface and top surface of one side plate respectively; or
- each encapsulation component closely adheres to and covers the outer surface, top surface, and inner surface of one side plate respectively.

Advantageously, each encapsulation component extends downward to form a retention part, which holds the outer surface of the corresponding bottom plate.

Advantageously, said encapsulation component defines an inward and/or outward-facing flange structure on the top surface of each side plate.

Advantageously, said elongated extrudate body, or at least part of the single-segment extrudates' side plate, are equipped with a guide hole structure.

Advantageously, said encapsulation component is either equal in length to said extrudate body or longer than said extrudate body.

Advantageously, said encapsulation component is a continuous strip of adhesive tape or film, with bumps, grooves, or ribs disposed on its outer or inner surface.

Another aspect of the present invention provides a flexible LED light strip which at least comprises:

- an overmolded extrudate structure which comprises an extrudate body and a continuous encapsulation component that covers at least part of the surface of said extrudate body, wherein:
  - said extrudate body includes two side plates and a bottom plate, which together form an accommodating space with an opening, said accommodating space is designed to accommodate and fix an LED light strip;
  - said encapsulation component is configured to fit with said extrudate body, covering at least one of the outer and inner surfaces of said two side plates, as well as the top surface of said side plates;
- an LED light strip, disposed within the accommodating space of said extrudate body of said extrudate structure.

Performing the present invention will bring out the following beneficial effects:

Due to the encapsulation components using continuous long tapes or films, and the extrudate body being potentially composed of multiple segments, the resulting flexible LED light strip can achieve both vertical and horizontal bending installation and use, enhancing the product's application flexibility.

As the encapsulation components have a good wrapping fit with the extrudate and can be waterproof, they allow for underwater installation and immersion use with the flexible light strip.

Since the encapsulation components can be customized in various colors for appearance, it improves the aesthetic appeal of the final product and allows it to be used in more settings.

With the protection of the encapsulation components, drawbacks like metal rusting and corrosion can be prevented, increasing product safety.

BRIEF DESCRIPTION OF THE DRAWINGS

In order to more clearly illustrate the embodiments of the present invention or the technical solutions in the prior art, the drawings used in the embodiments or the description of the prior art will be briefly described below. Obviously, the drawings in the following description are only certain embodiments of the present invention, and other drawings can be obtained from those skilled in the art without any creative work.

DETAILED DESCRIPTION OF THE EMBODIMENTS

Figure 1:
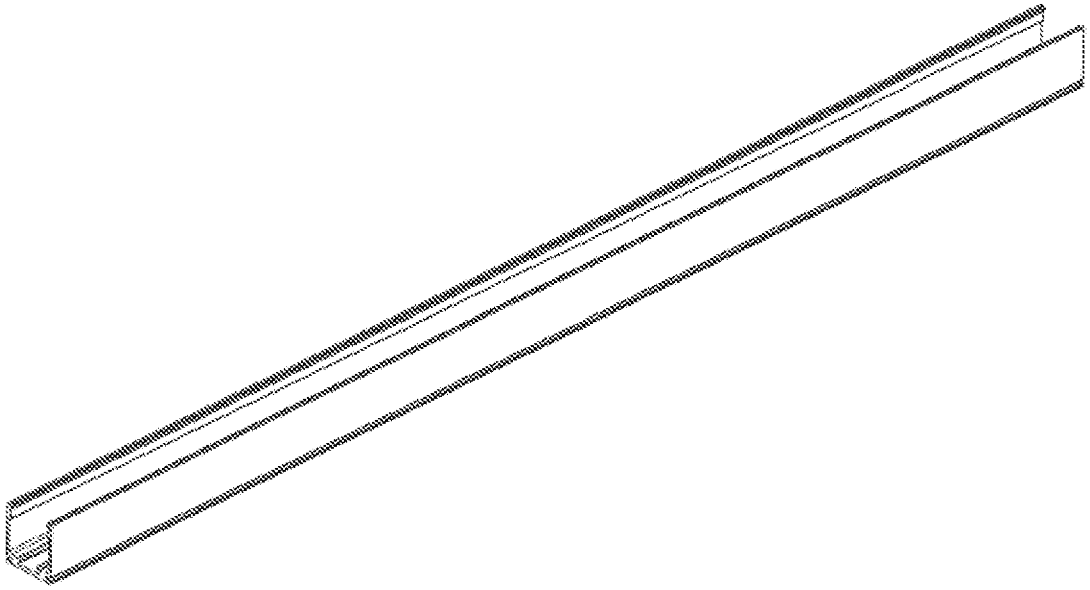
FIG. 1 illustrates a structural schematic diagram of an existing extrudate.

The technical solutions in the embodiments of the present invention are clearly and completely described below with reference to the accompanying drawings in the embodiments of the present invention. Apparently, the described embodiments are merely a part of but not all embodiments of the present invention. All other embodiments obtained by a person of ordinary skilled in the art based on the embodiments of the present invention without creative efforts shall fall within the protection scope of the present invention.

It should be noted that, in order to avoid obscuring the present invention due to unnecessary details, only structures and/or processing steps closely related to the scheme according to the present invention are shown in the drawings, while other details less relevant to the present invention are omitted.

Figure 2:
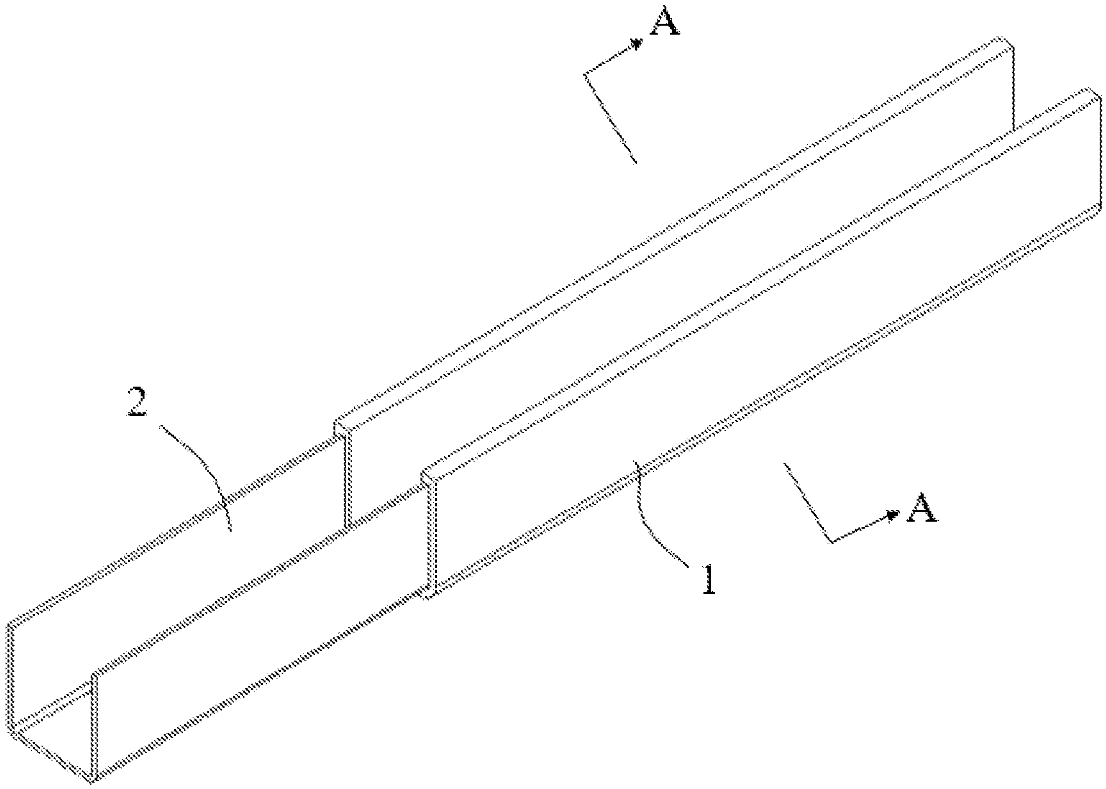
FIG. 2 illustrates a structural schematic diagram of the first embodiment of an overmolded extrudate structure provided by the present invention.
Figure 3:
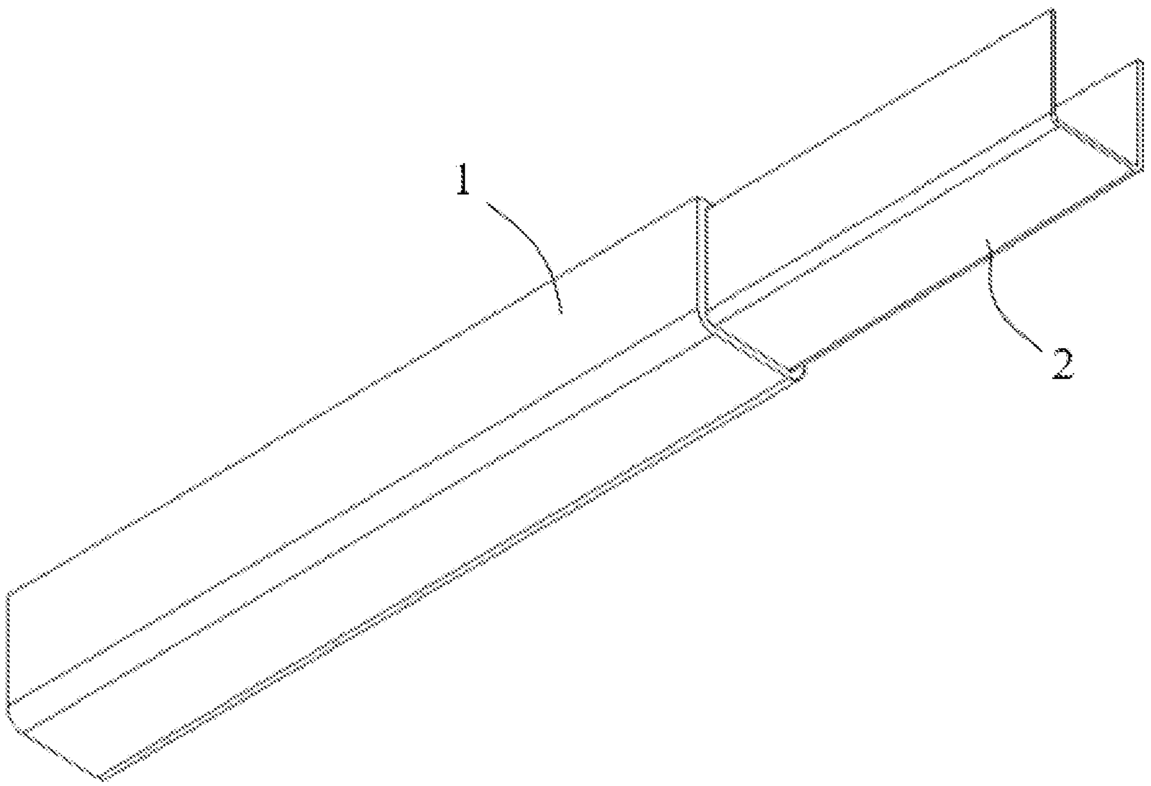
FIG. 3 illustrates a bottom view of the structure shown in FIG. 2.

As shown in FIG. 2, a structural schematic of the first embodiment of an overmolded extrudate structure provided by the present invention is illustrated. In conjunction with FIGS. 3 to 5, this embodiment of the overmolded extrudate structure comprises an extrudate body 2 and a continuous encapsulation component 1 that covers at least part of the surface of the extrudate body 2, wherein:

- the extrudate body 2 includes two side plates 21 and a bottom plate 22, which together form an accommodating space with an opening, the accommodating space is designed to accommodate and fix an LED light strip;
- the encapsulation component 1 is configured to fit with the extrudate body 2, covering at least one of the outer and inner surfaces of the two side plates 21, as well as the top surface of the side plates 21.

Figure 4:
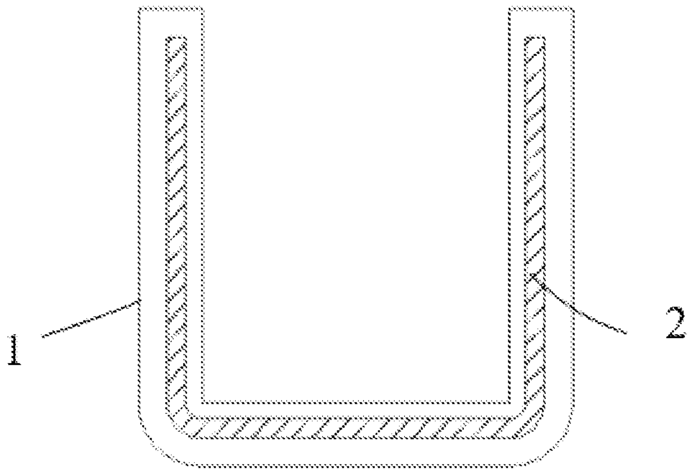
FIG. 4 illustrates an A-A cross-sectional view of the structure shown in FIG. 2.

As can be seen from FIG. 4, the section with left-slanting hatch marks represents the extrudate body 2, while the other unhatched parts correspond to the cross-section of the encapsulation component 1. In this embodiment, to facilitate differentiation, no hatching is applied to the cross-section of the encapsulation component 1, and the same approach is used throughout the following description.

Figure 5:
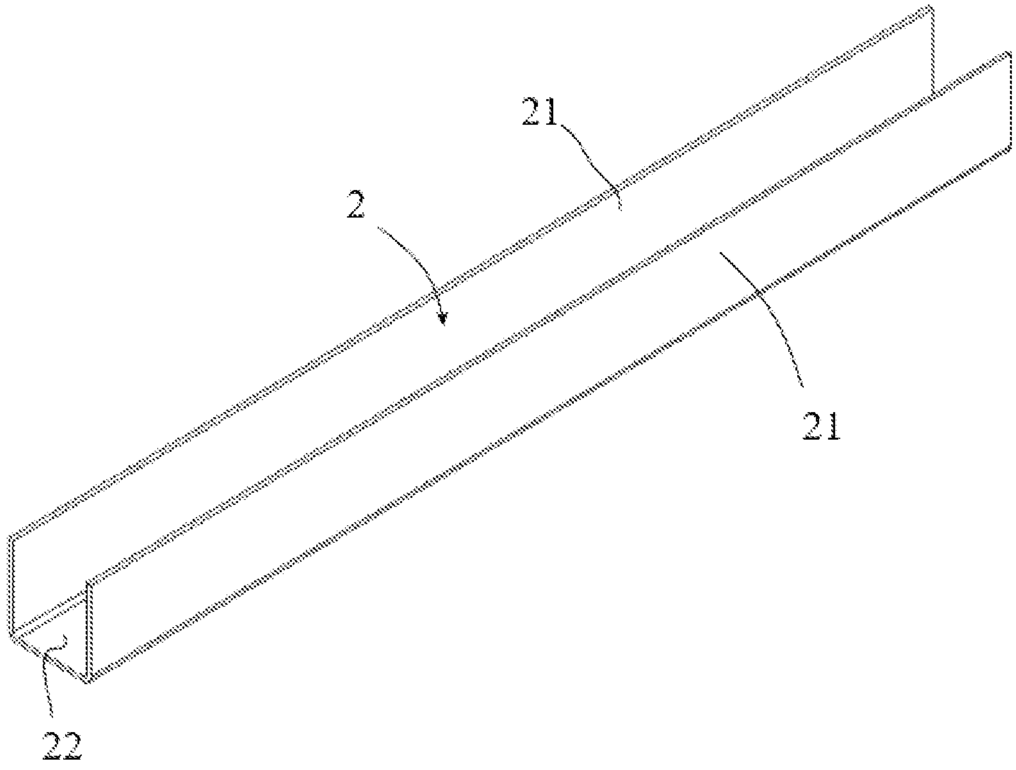
FIG. 5 illustrates a structural schematic diagram of the extrudate body shown in FIG. 2.

In FIG. 1, the extrudate body 2 is an integrally formed elongated bar-shaped extrudate body (as shown in FIG. 5). The extrudate body may be made of copper, iron, steel, or other metals, or hard non-metallic materials such as PC, PBT, etc. Additionally, in FIG. 1, the cross-section of the extrudate body 2 is a U-shaped structural component. It should be understood that, for different applications, the cross-section of the extrudate body can also be of any other regular or irregular shape.

Figure 6:
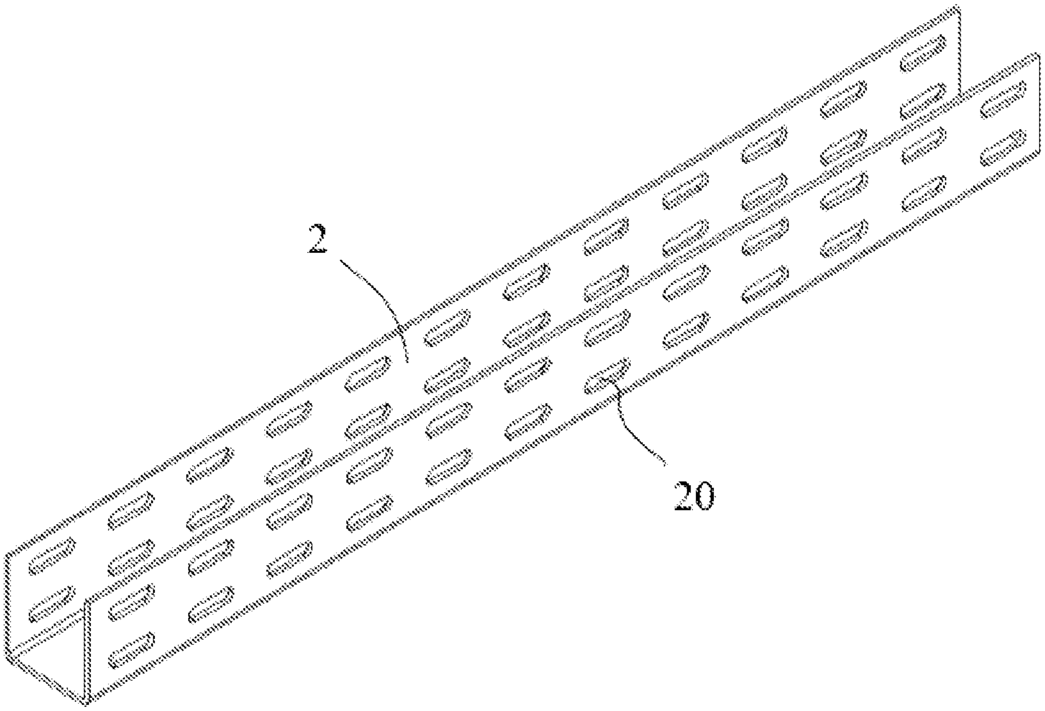
FIG. 6 illustrates a structural schematic diagram of the second type of extrudate body involved in the present invention.

In some examples, as shown in FIG. 6, the elongated extrudate body is provided with a guide hole structure 20. The guide hole structure 20 may include circular holes, slot holes, triple-hole shapes, or any other regular or irregular shaped guides. Providing the guide hole structure 20 can reduce material costs and increase the friction between the extrudate body and the encapsulation component, as well as the LED light strip, thereby enhancing the bond between them.

Figure 7:
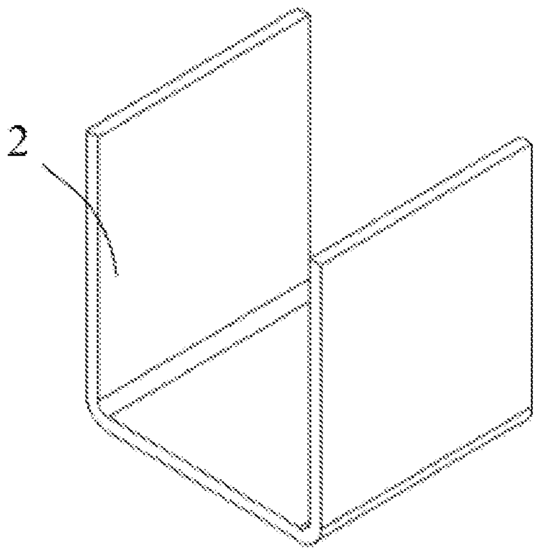
FIG. 7 illustrates a structural schematic diagram of the third type of extrudate body involved in the present invention.
Figure 8:
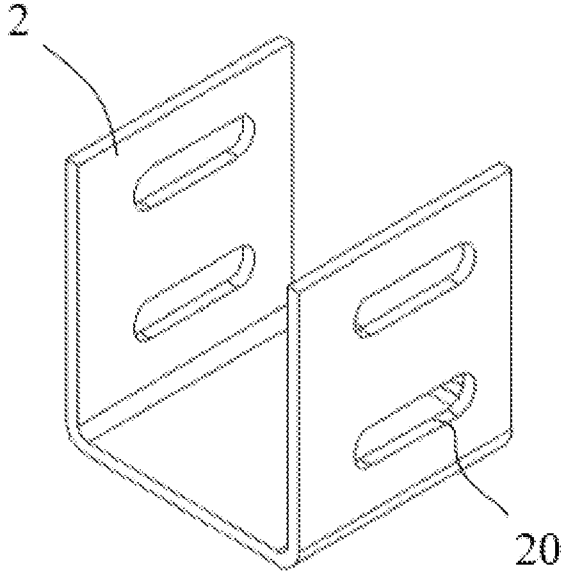
FIG. 8 illustrates a structural schematic diagram of the fourth type of extrudate body involved in the present invention.

In other examples, the extrudate body 2 may be formed by splicing a plurality of single-segment extrudates as shown in FIG. 7 or FIG. 8. Specifically, in some instances, the extrudate body 2 can be assembled from a plurality of single-segment extrudates depicted in FIG. 7, or from those shown in FIG. 8, or it can be a hybrid assembly of single-segment extrudates from both FIGS. 7 and 8. The single-segment extrudate shown in FIG. 8 is also equipped with the guide hole structure 20.

In the example shown in FIG. 1, there is one encapsulation component 1, which closely adheres to and wraps around both the inner and outer surfaces and the top surface of the extrudate body 2. That is, in the embodiment of FIG. 1, except for the two end parts of the extrudate body 2, the encapsulation component 1 completely encases the extrudate body 2.

Figure 9:
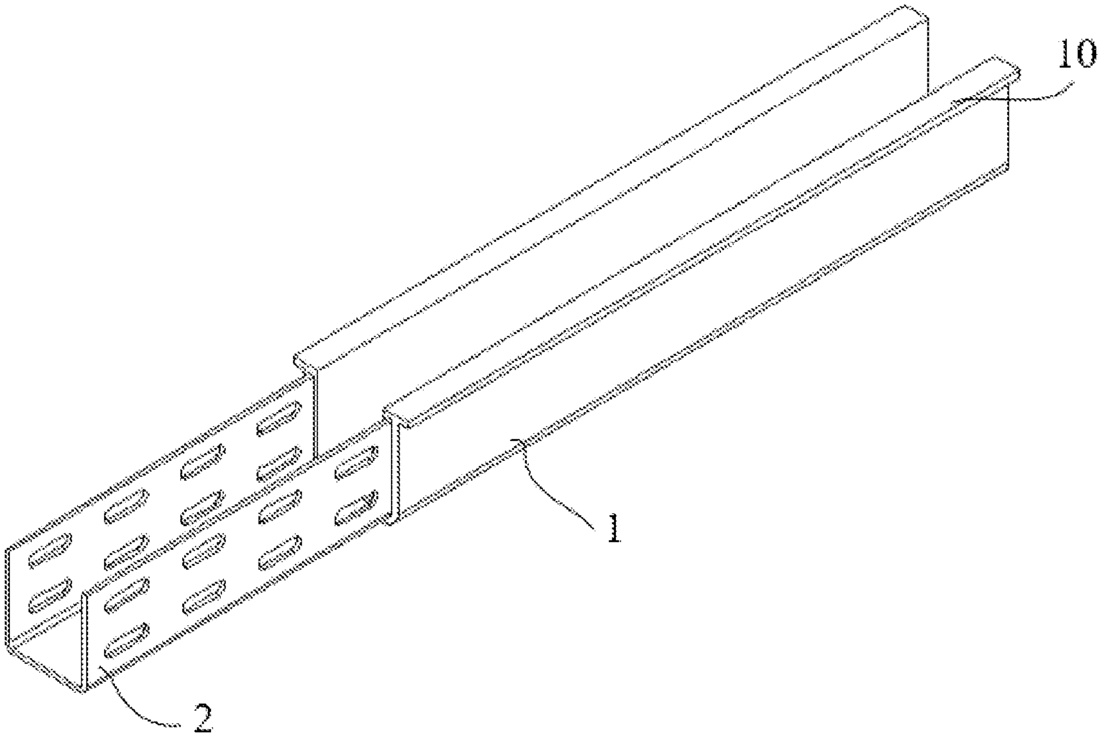
FIG. 9 illustrates a structural schematic diagram of the second embodiment of an overmolded extrudate structure provided by the present invention.
Figure 10:
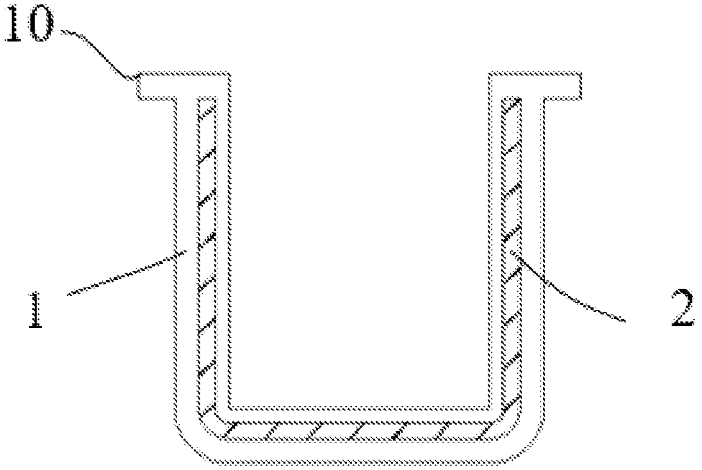
FIG. 10 illustrates a cross-sectional view of the structure shown in FIG. 9.

As shown in FIG. 9, a structural schematic of the second embodiment of an overmolded extrudate structure provided by the present invention is illustrated. In conjunction with FIG. 10, the difference between the second embodiment and the first lies in that the extrudate body 2 employs the elongated extrudate body with the guide hole structure 20 as shown in FIG. 6, moreover, the encapsulation component 1 has an outward-turning flange structure 10 on the top surface of each side plate.

Figure 11:
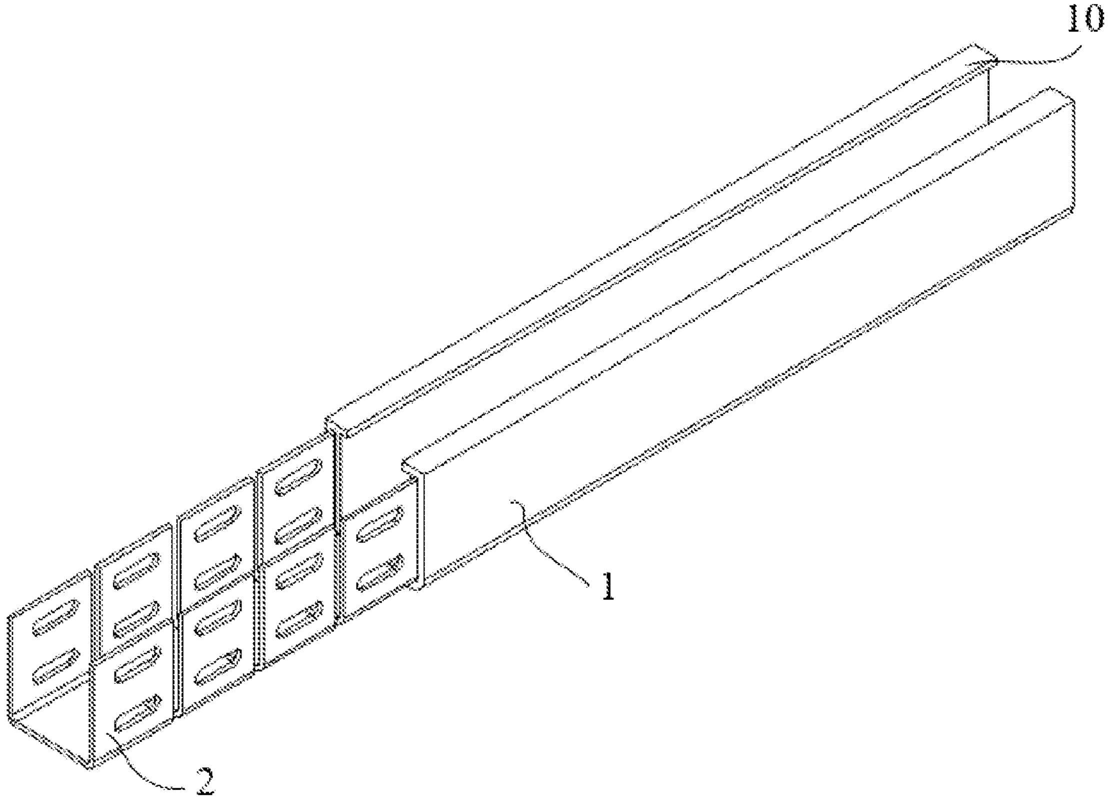
FIG. 11 illustrates a structural schematic diagram of the third embodiment of an overmolded extrudate structure provided by the present invention.
Figure 12:
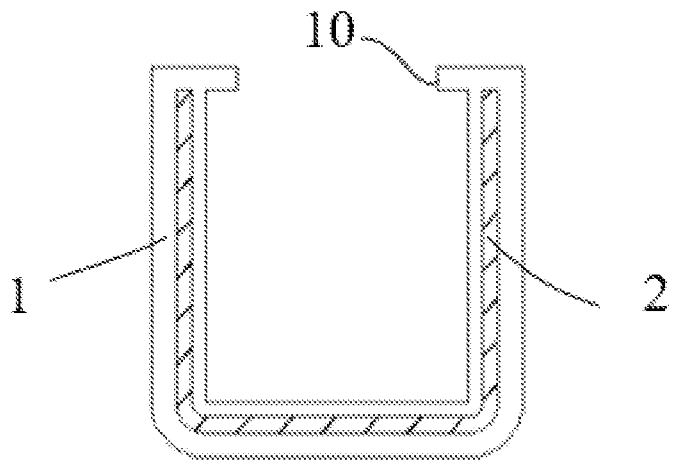
FIG. 12 illustrates a cross-sectional view of the structure shown in FIG. 11.

As shown in FIG. 11, a structural schematic of the third embodiment of an overmolded extrudate structure provided by the present invention is illustrated. In conjunction with FIG. 12, the distinction of the third embodiment from the first lies in that the extrudate body 2 uses a plurality of single-segment extrudate bodies with the guide hole structure 20 as shown in FIG. 8, moreover, the encapsulation component has an inward-turning flange structure 10 on the top surface of each side plate.

Figure 13:
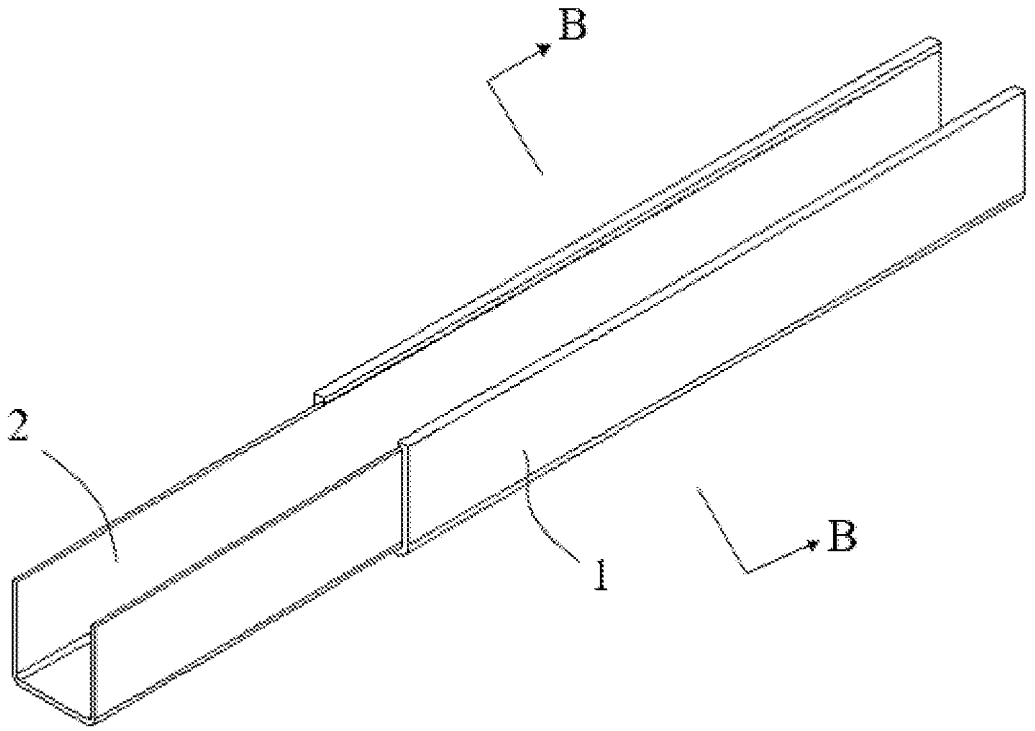
FIG. 13 illustrates a structural schematic diagram of the fourth embodiment of an overmolded extrudate structure provided by the present invention.
Figure 14:
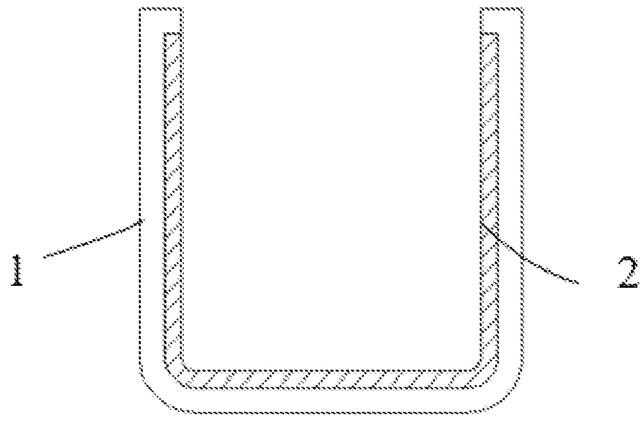
FIG. 14 illustrates a B-B cross-sectional view of the structure shown in FIG. 13.

As shown in FIG. 13, a structural schematic of the fourth embodiment of an overmolded extrudate structure provided by the present invention is illustrated. In conjunction with FIG. 14, the difference between the fourth embodiment and the first lies in that there is one encapsulation component 1, but it closely adheres to and wraps around the outer surface of each side plate, the top surface, and the outer surface of the bottom plate of the extrudate body 2 respectively.

Figure 15:
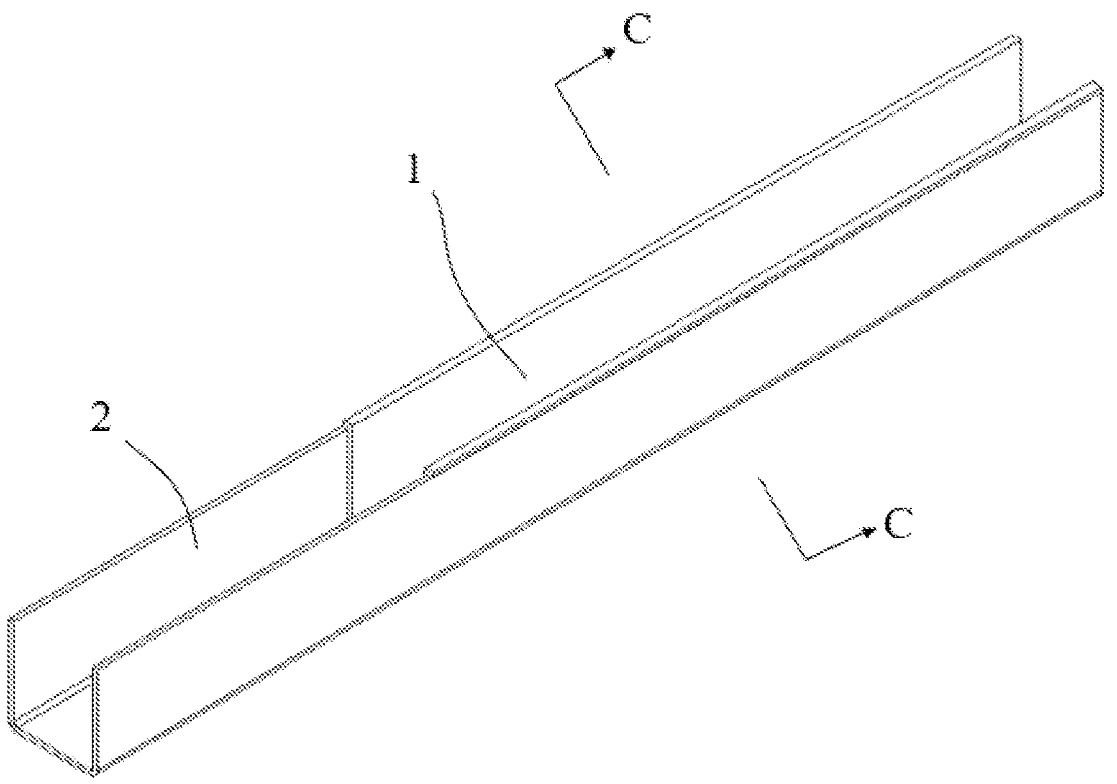
FIG. 15 illustrates a structural schematic diagram of the fifth embodiment of an overmolded extrudate structure provided by the present invention.
Figure 16:
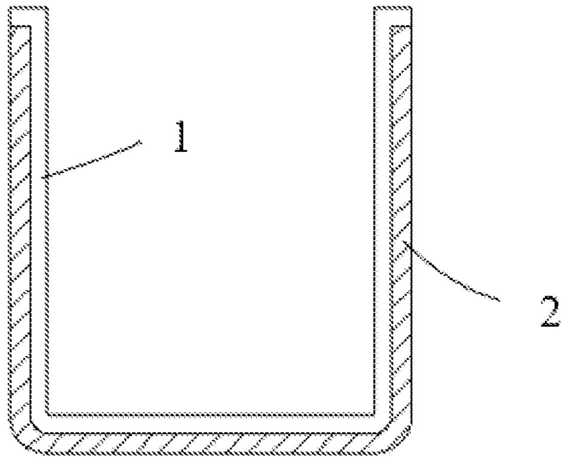
FIG. 16 illustrates a C-C cross-sectional view of the structure shown in FIG. 15.

As shown in FIG. 15, a structural schematic of the fifth embodiment of an overmolded extrudate structure provided by the present invention is illustrated. In conjunction with FIG. 16, the difference between the fifth embodiment and the first lies in that there is one encapsulation component 1, but it closely adheres to and wraps around the inner surface of each side plate, the top surface, and the inner surface of the bottom plate of the extrudate body 2 respectively.

Figure 17:
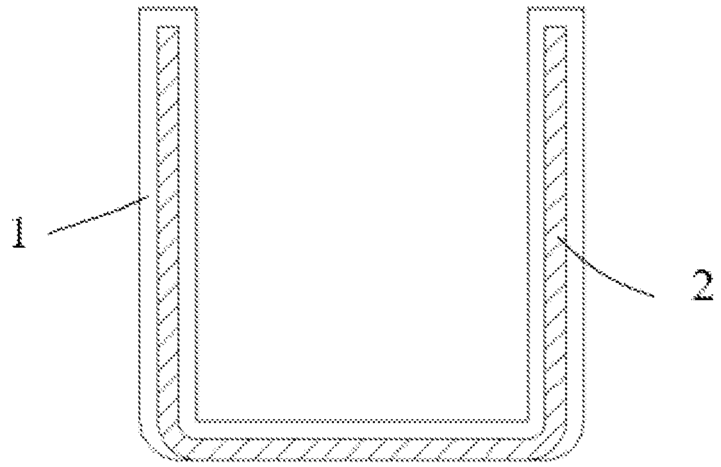
FIG. 17 illustrates a cross-sectional structural schematic diagram of the sixth embodiment of an overmolded extrudate structure provided by the present invention.

As shown in FIG. 17, a cross-sectional structural schematic of the sixth embodiment of an overmolded extrudate structure provided by the present invention is illustrated. In the sixth embodiment, the difference from the first lies in that there is one encapsulation component 1, but it closely adheres to and wraps around both the inner and outer surfaces of each side plate, the top surface, and the inner surface of the bottom plate of the extrudate body 2 respectively.

Figure 18:
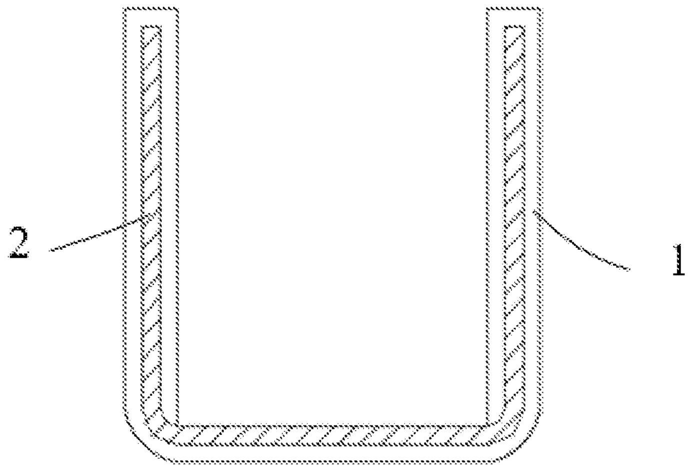
FIG. 18 illustrates a cross-sectional structural schematic diagram of the seventh embodiment of an overmolded extrudate structure provided by the present invention.

As shown in FIG. 18, a cross-sectional structural schematic of the seventh embodiment of an overmolded extrudate structure provided by the present invention is illustrated. In the seventh embodiment, the difference from the first lies in that there is one encapsulation component 1, but it closely adheres to and wraps around both the inner and outer surfaces of each side plate, the top surface, and the outer surface of the bottom plate of the extrudate body 2 respectively.

Figure 19:
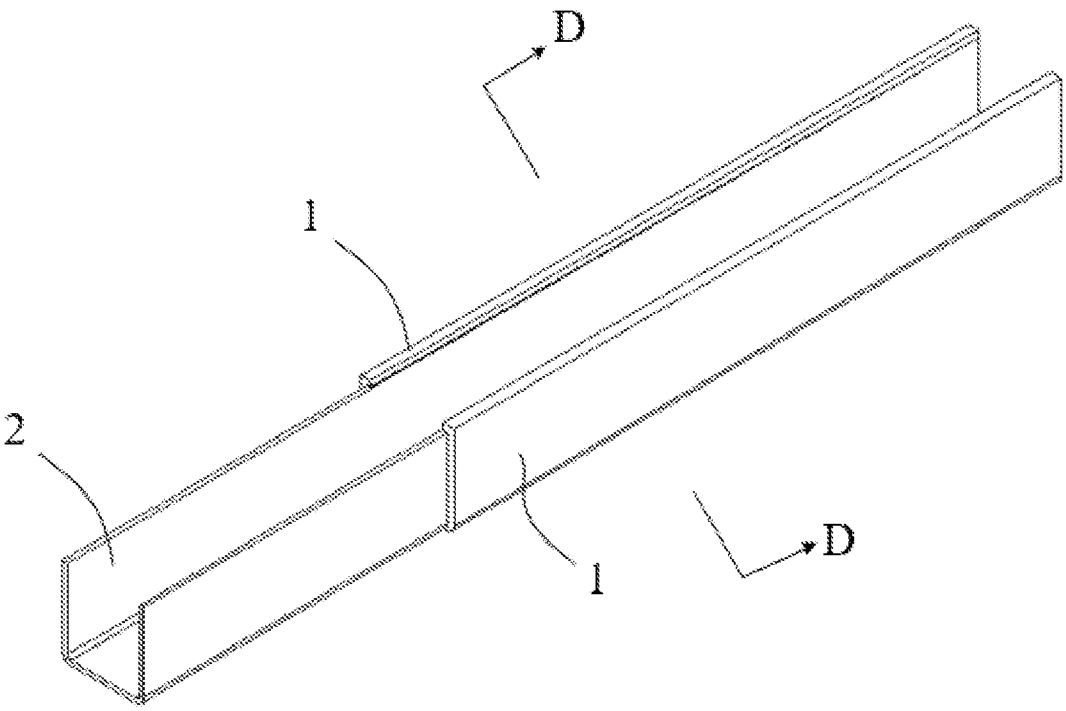
FIG. 19 illustrates a structural schematic diagram of the eighth embodiment of an overmolded extrudate structure provided by the present invention.
Figure 20:
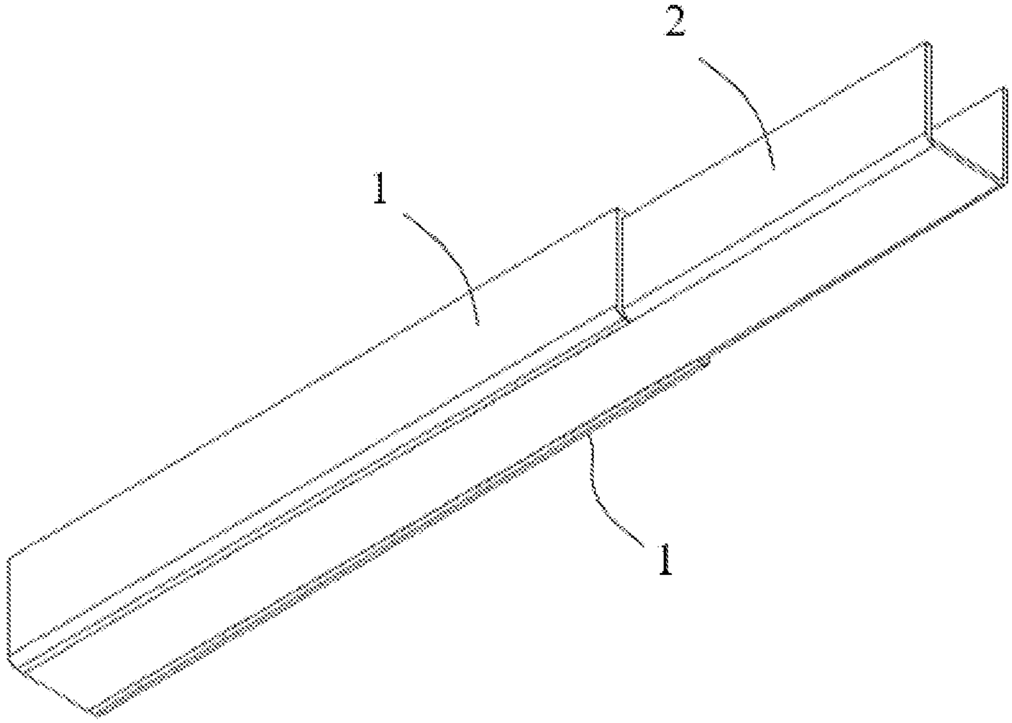
FIG. 20 illustrates a bottom view of the structure shown in FIG. 19.
Figure 21:
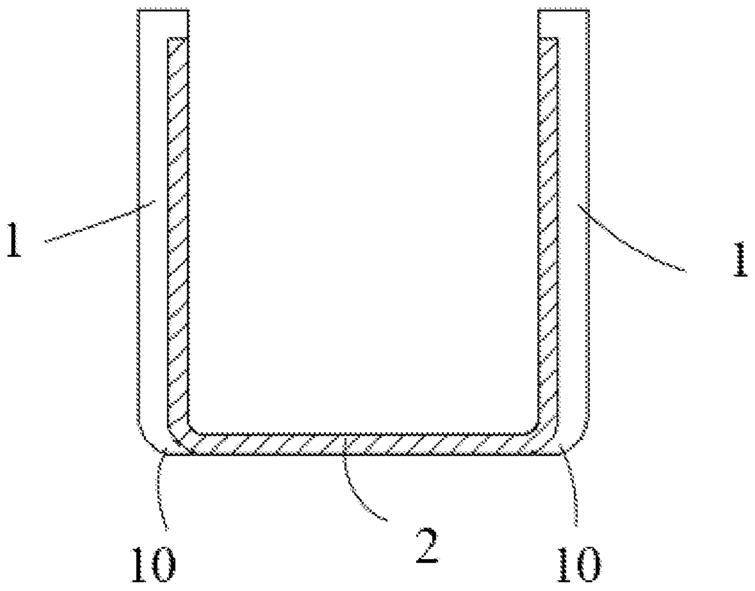
FIG. 21 illustrates a D-D cross-sectional view of the structure shown in FIG. 20.

As shown in FIG. 19, a structural schematic of the eighth embodiment of an overmolded extrudate structure provided by the present invention is illustrated. In conjunction with FIGS. 20 and 21, the difference between the eighth embodiment and the first lies in that there are two encapsulation components 1, each closely adhering to and covering the outer surface and top surface of one side plate respectively. Additionally, each encapsulation component 1 extends downward to form a retention part 10, which holds the outer surface of the corresponding bottom plate.

Figure 22:
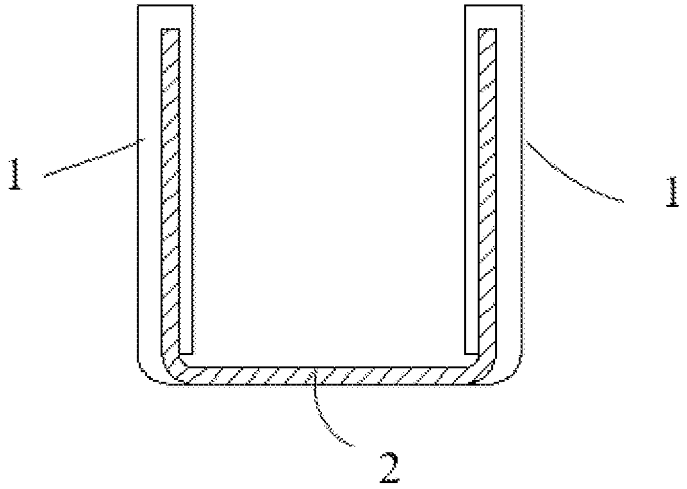
FIG. 22 illustrates a cross-sectional structural schematic diagram of the ninth embodiment of an overmolded extrudate structure provided by the present invention.

As shown in FIG. 22, a cross-sectional structural schematic of the ninth embodiment of an overmolded extrudate structure provided by the present invention is illustrated. In the ninth embodiment, the difference from the first lies in that there are two encapsulation components 1, each closely adhering to and covering the inner and outer surfaces as well as the top surface of one side plate. Additionally, each encapsulation component 1 extends downward to form a retention part, which holds the outer surface of the corresponding bottom plate.

Figure 23:
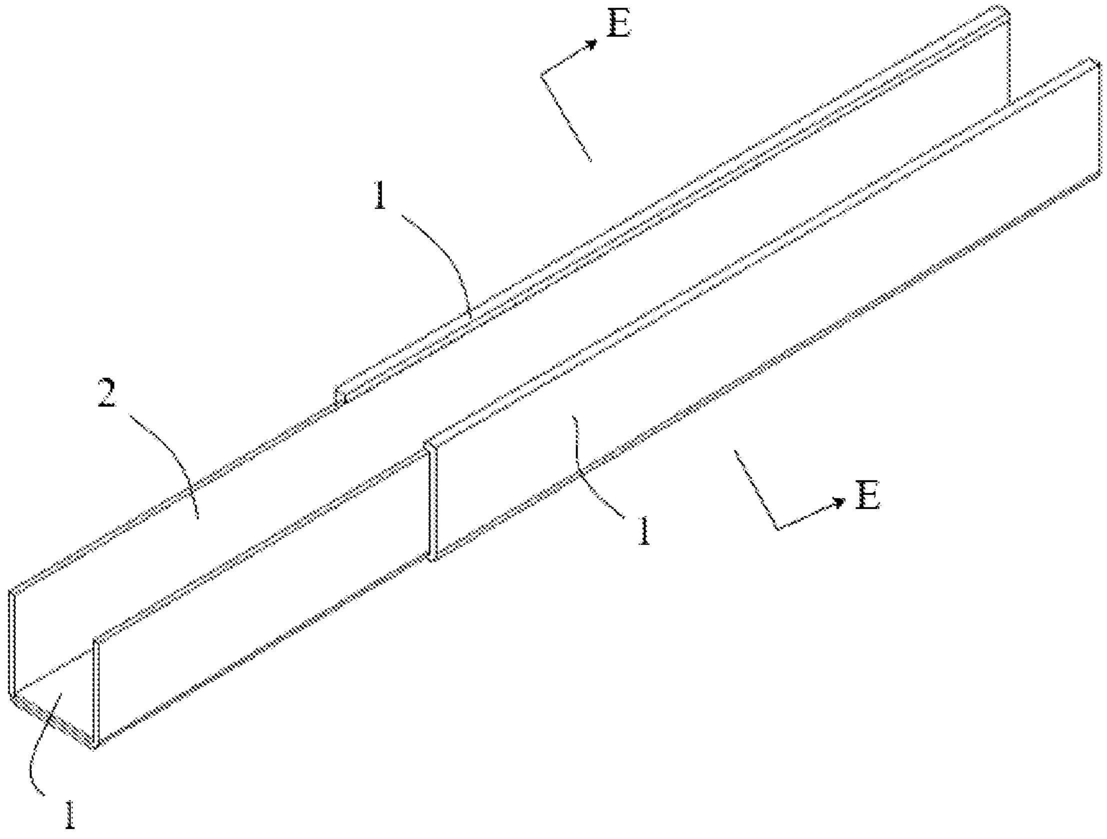
FIG. 23 illustrates a structural schematic diagram of the tenth embodiment of an overmolded extrudate structure provided by the present invention.
Figure 24:
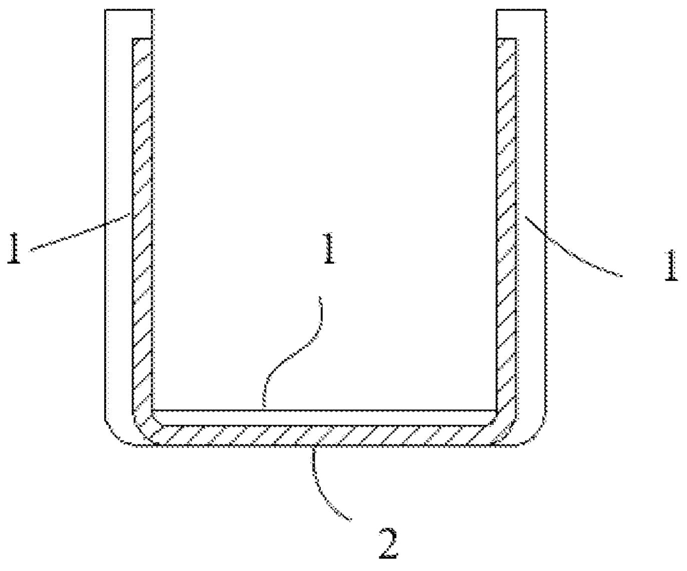
FIG. 24 illustrates an E-E cross-sectional view of the structure shown in FIG. 23.

As shown in FIG. 23, a cross-sectional structural schematic of the tenth embodiment of an overmolded extrudate structure provided by the present invention is illustrated. In conjunction with FIG. 24, the difference between the tenth embodiment and the first lies in that there are three encapsulation components 1. Two of these encapsulation components closely adhere to and cover the inner and outer surfaces as well as the top surface of one side plate, while the other encapsulation component closely adheres to and covers the inner surface of the bottom plate.

It is understood that in the embodiments of the present invention, specifically the first, fourth through tenth embodiments, the elongated extrudate body can be interchangeably utilized with the one featuring a guide hole structure 20 as depicted in FIG. 6. It can also be substituted by splicing together a plurality of single-segment extrudates shown in FIG. 7, or those from FIG. 8, or by a combination of single-segment extrudates from both figures. In these embodiments, the encapsulation component 1 is designed to form an inward and/or outward-facing flange structure on the top surface of each side plate.

More specifically, in some concrete examples, the encapsulation component 1 is a continuous adhesive tape or film, and the encapsulation component 1 has bumps, grooves, or ribs on its outer or inner surface. The encapsulation component is either equal in length to the extrudate body or longer. It can be made from materials such as silicone, PVC, PU, or other soft plastics, and its shape is capable of stretching or contracting within certain limits under the influence of external forces, similar to a spring. Likewise, the continuous adhesive tape or film can be black, white, red, green, blue, or any other arbitrary color.

In a corresponding aspect, the present invention also provides a flexible LED light strip, which at least includes:

The extrudate structure as described in FIGS. 2 to 24;

An LED light strip, disposed within the accommodating space of the extrudate body of the extrudate structure.

For additional details, reference may be made to the descriptions of FIGS. 2 to 24 provided earlier, without repeating the explanation here.

Performing the present invention will bring out the following beneficial effects:

Due to the encapsulation components using continuous long tapes or films, and the extrudate body being potentially composed of multiple segments, the resulting flexible LED light strip can achieve both vertical and horizontal bending installation and use, enhancing the product's application flexibility.

As the encapsulation components have a good wrapping fit with the extrudate and can be waterproof, they allow for underwater installation and immersion use with the flexible light strip.

Since the encapsulation components can be customized in various colors for appearance, it improves the aesthetic appeal of the final product and allows it to be used in more settings.

With the protection of the encapsulation components, drawbacks like metal rusting and corrosion can be prevented, increasing product safety.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An overmolded extrudate structure comprises an extrudate body and a continuous encapsulation component that covers at least part of the surface of said extrudate body, wherein:

said extrudate body includes two side plates and a bottom plate, which together form an accommodating space with an opening, said accommodating space is designed to accommodate and fix an LED light strip;

said encapsulation component is configured to fit with said extrudate body, covering at least one of the outer and inner surfaces of said two side plates, as well as the top surface of said side plates;

wherein said extrudate body is an integrally formed elongated extrudate body, alternatively, said extrudate body is assembled by splicing together a plurality of single-segment extrudates;

wherein there are two encapsulation components and each encapsulation component closely adheres to and covers the outer surface and top surface of one side plate respectively; or each encapsulation component closely adheres to and covers the outer surface, top surface, and inner surface of one side plate respectively; and wherein each encapsulation component extends downward to form a retention part, which holds the outer surface of the corresponding bottom plate.

2. The extrudate structure as claimed in claim 1, wherein there is one encapsulation component and said encapsulation component closely adheres to and wraps around the inner and outer surfaces as well as the top surface of said extrudate body respectively; or said encapsulation component closely adheres to and wraps around the outer surface, top surface, and bottom surface of each side plate of said extrudate body respectively; or said encapsulation component closely adheres to and wraps around the inner surface, top surface, and bottom surface of each side plate of said extrudate body respectively; or said encapsulation component closely adheres to and wraps around the inner and outer surfaces, top surface, and bottom surface of each side plate of said extrudate body respectively; or said encapsulation component closely adheres to and wraps around the inner and outer surfaces, top surface, and the inner surface of the bottom plate of said extrudate body respectively.

3. The extrudate structure as claimed in claim 1, wherein said encapsulation component defines an inward and/or outward-facing flange structure on the top surface of each side plate.

4. The extrudate structure as claimed in claim 3, wherein said elongated extrudate body, or at least part of the single-segment extrudates' side plate, are equipped with a guide hole structure.

5. The extrudate structure as claimed in claim 4, wherein said encapsulation component is either equal in length to said extrudate body or longer than said extrudate body.

6. The extrudate structure as claimed in claim 5, wherein said encapsulation component is a continuous strip of adhesive tape or film, with bumps, grooves, or ribs disposed on its outer or inner surface.

* * * * *